(12) United States Patent
Ueda et al.

(10) Patent No.: US 8,736,725 B2
(45) Date of Patent: May 27, 2014

(54) SOLID-STATE IMAGING DEVICE, IMAGING METHOD AND IMAGING APPARATUS FOR PERFORMING WEIGHTED ADDITION ON PIXEL SIGNALS

(75) Inventors: Ryo Ueda, Kanagawa (JP); Yoshinori Muramatsu, Kanagawa (JP); Atsushi Suzuki, Kanagawa (JP)

(73) Assignee: Sony Corporation (JP)

( * ) Notice: Subject to any disclaimer, the term of this patent is extended or adjusted under 35 U.S.C. 154(b) by 28 days.

(21) Appl. No.: 13/444,014

(22) Filed: Apr. 11, 2012

(65) Prior Publication Data

US 2012/0268630 A1    Oct. 25, 2012

(30) Foreign Application Priority Data

Apr. 19, 2011   (JP) .................................. 2011-092986

(51) Int. Cl.
*H04N 3/14* (2006.01)
*H04N 5/335* (2011.01)
*H04N 9/04* (2006.01)

(52) U.S. Cl.
USPC .......................................... 348/272; 348/308

(58) Field of Classification Search
CPC ...................................................... H04N 9/045
USPC ............................................................ 348/272
See application file for complete search history.

(56) References Cited

U.S. PATENT DOCUMENTS

| | | | | |
|---|---|---|---|---|
| 8,084,729 | B2 * | 12/2011 | Kato et al. ................. | 250/208.1 |
| 2002/0154347 | A1 * | 10/2002 | Funakoshi et al. ............ | 358/513 |
| 2009/0219429 | A1 * | 9/2009 | Ogura et al. .................. | 348/308 |
| 2010/0060754 | A1 * | 3/2010 | Ogura et al. .................. | 348/241 |
| 2010/0283881 | A1 * | 11/2010 | Araki et al. .................... | 348/308 |

FOREIGN PATENT DOCUMENTS

JP      2009-212612      9/2009

\* cited by examiner

*Primary Examiner* — Roberto Velez
*Assistant Examiner* — Cynthia Segura
(74) *Attorney, Agent, or Firm* — Sheridan Ross P.C.

(57) ABSTRACT

A solid-state imaging device includes: a pixel array unit having plural pixels arranged in a row direction and a column direction; a weighted addition unit performing weighted addition on pixel signals read out from the plural pixels as analog signals; an A/D converter performing A/D conversion of the pixel signals on which weighted addition is performed; and a computing unit computing the A/D converted pixel signals.

13 Claims, 10 Drawing Sheets

SOLID-STATE IMAGING DEVICE, IMAGING METHOD AND IMAGING APPARATUS FOR PERFORMING WEIGHTED ADDITION ON PIXEL SIGNALS

FIELD

The present disclosure relates to a solid-state imaging device, an imaging method and an imaging apparatus, and particularly relates to the solid-state imaging device, the imaging method and the imaging apparatus capable of suppressing power consumption.

BACKGROUND

In a CMOS (Complementary Metal Oxide Semiconductor) image sensor, a large number of pixels are arranged in a matrix state. When high-speed imaging is performed, it is necessary to read out image data at high speed. Accordingly, it is proposed that given pixels are thinned out from a large number of pixels when performing readout (for example, JP-A-2009-212612).

It is possible to read out pixel data at high speed by thinning out pixels to be read out.

However, image quality is deteriorated by simple thinning-out processing. Accordingly, the averaging is performed to pixel data in order to suppress the deterioration of image quality.

SUMMARY

The averaging of pixel data is performed, for example, after reading out all pixel data and performing A/D conversion of the read pixel data.

However, all pixel data is read out in this case, therefore, it is difficult to suppress power consumption.

In view of the above, it is desirable to suppress power consumption.

An embodiment of the present disclosure is directed to a solid-state imaging device including a pixel array unit having plural pixels arranged in a row direction and a column direction, a weighted addition unit performing weighted addition on pixel signals read out from the plural pixels as analog signals, an A/D converter performing A/D conversion of the pixel signals on which weighted addition is performed, and a computing unit computing the A/D converted pixel signals.

Pixels of a first color and a second color are arranged in rows and arrangement of numerals representing a ratio of weight of the first color may be reversed with respect to arrangement of numerals representing a ratio of weight of the second color.

The weighted addition unit may include, in the first color and the second color respectively, plural weighted lines connected to one read line which reads out the pixel signals from the pixels of one column and to which the pixel signals from one readout line are inputted, capacitors connected in series to the respective weighted lines, a first switch arranged on one weighed line of the plural weighted lines of one column and controlling supply of the pixel signals from the readout line to the capacitor in the corresponding column, and a second switch supplying signals from one weighted line in another column of the same color to the capacitor in which the supply of the pixel signals is controlled by the first switch.

The solid-state imaging device may further include a third switch controlling supply of the pixel signals to the capacitor in the corresponding column in the weighed line of the column supplying the pixel signals to another column of the same color through the second switch when supplying the pixel signals to another column of the same color through the second switch.

The ratio of weight in the first color may be 3:1 and the ratio of weight in the second color may be 1:3.

The ratio of weight in the first color may be 9:3:3:1 and the ratio of weight in the second color may be 1:3:3:9.

Another embodiment of the present disclosure is directed to an imaging method including performing weighted addition on pixel signals read out from plural pixels arranged in a row direction and in a column direction in a pixel array unit as analog signals, performing A/D conversion of the pixel signals on which the weighted addition is performed, and computing the A/D converted pixel signals.

Still another embodiment of the present disclosure is directed to an imaging apparatus including a solid-state imaging device performing photoelectric conversion of light from a lens, and a display unit displaying images based on image signals from the solid-state imaging device, in which the solid-state imaging device has a pixel array unit having plural pixels arranged in a row direction and a column direction, a weighted addition unit performing weighted addition on pixel signals read out from the plural pixels as analog signals, an A/D converter performing A/D conversion of the pixel signals on which weighted addition is performed, and a computing unit computing the A/D converted pixel signals.

In the embodiment of the present disclosure, weighted addition is performed on pixel signals read out from plural pixels arranged in the row direction and the column direction in the pixel array unit, the pixel signals on which weighted addition is performed is A/D converted and the A/D converted pixel signals are computed.

According to the embodiments of the present disclosure, power consumption can be suppressed.

DETAILED DESCRIPTION

Hereinafter, a mode for carrying out the present disclosure (hereinafter referred to as an embodiment) will be explained. The explanation will be made in the following order.

1. Configuration of Solid-State Imaging Device
2. Configuration of Weighted Addition Unit
3. Readout of All Pixel Signals
4. Readout of Weighted Addition Pixel Signals 5. Principle of Weighted Addition
6. Results of Weighted Addition
7. Configuration of Imaging Apparatus

[Configuration of Solid-State Imaging Device]

Figure 1:
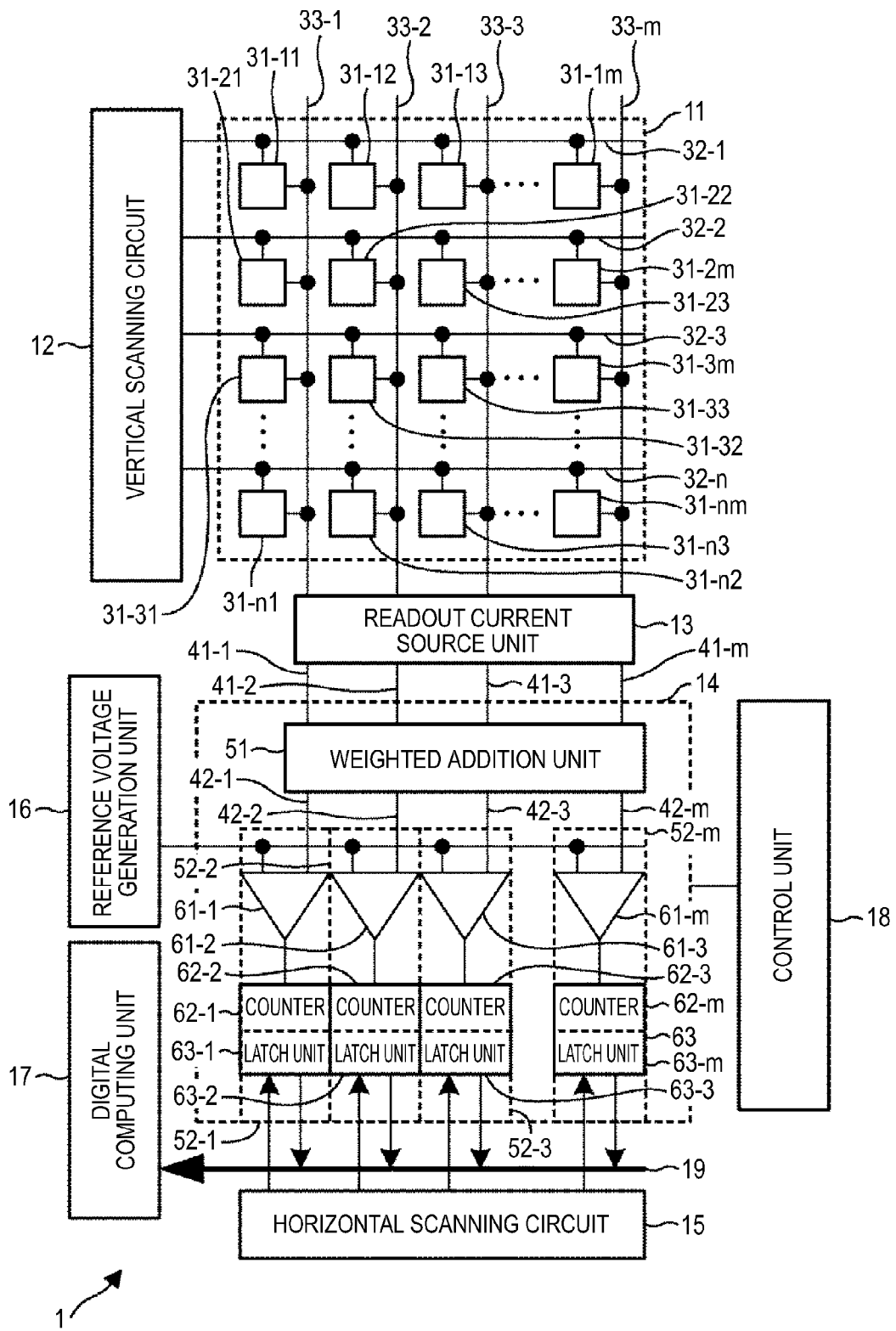
FIG. 1 is a block diagram showing a configuration of a solid-state imaging device according to an embodiment of the present disclosure.

FIG. 1 is a block diagram showing a configuration of a solid-state imaging device 1 according to an embodiment of the present disclosure. The solid-state imaging device 1 is formed by, for example, a CMOS image sensor. The solid-state imaging device 1 includes a pixel array unit 11, a vertical scanning circuit 12, a readout current source unit 13, a column processing unit 14, a horizontal scanning circuit 15, a reference voltage generation unit 16, a digital computing unit 17, a control unit 18 and a bus 19.

The pixel array unit 11 has n×m pieces of pixels 31-$ij$ ("i" indicates a row-number and takes values of 1, 2, ..., n. "j" indicates a column-number and takes values of 1, 2, ..., m). Respective pixels 31-$ij$ are connected to row control lines 32-$i$ as well as connected to readout lines 33-$j$. The vertical scanning circuit 12 selectively drives respective row control lines 32-$i$, to thereby read out pixel signals of the pixels 31-$ij$ connected to the row to corresponding readout lines 33-$j$. In the following description, when it is not necessary to distinguish the pixels 31-$ij$ from one another, they are written merely as the pixels 31. The same applies to other components.

The readout current source unit 13 functions as a current source necessary for readout, outputting pixel signals inputted from respective readout lines 33-$j$ to corresponding readout lines 41-$j$.

The column processing unit 14 includes a weighted addition unit 51 and column A/D circuits 52-1 to 52-$m$. The weighted addition unit 51 performs weighted addition on pixel signals inputted from the readout lines 41-$j$ as analog signals, outputting the signals from readout lines 42-$j$ corresponding to the readout lines 41-$j$.

The column A/D circuit 52-$j$ includes a comparator 61-$j$, a counter 62-$j$ and a latch unit 63-$j$.

The comparator 61-$j$ compares a reference voltage magnitude of which varies in steps which is supplied from the reference voltage generation unit 16 with pixel signals supplied from the weighed addition unit 51 through the readout line 42-$j$. An output of the comparator 61-$j$ varies when a value of the pixel signal is higher (may be lower) than the reference voltage. The counter 62-$j$ counts clocks supplied from the control unit 18. The latch unit 63-$j$ latches a value of the counter 62-$j$ obtained when the output of the comparator varies. The value corresponds to a voltage of the pixel signal. That is, the pixel signals read out from respective pixels 31-$ij$ are A/D converted.

The horizontal scanning circuit 15 selectively drives the latch units 63-$j$ sequentially, reads out the pixel data latched by the latch units 63-$j$ to the bus 19 and supplies the data to the digital computing unit 17. The digital computing unit 17 processes the inputted pixel data and outputs the data to a not-shown circuit. In the digital computing unit 17, processing such as a clamp level, a black level and pixel sorting is performed.

[Configuration of Weighted Addition Unit]

Next, a configuration of the weighted addition unit 51 will be explained with reference to FIG. 2 and FIG. 3.

Figure 2:
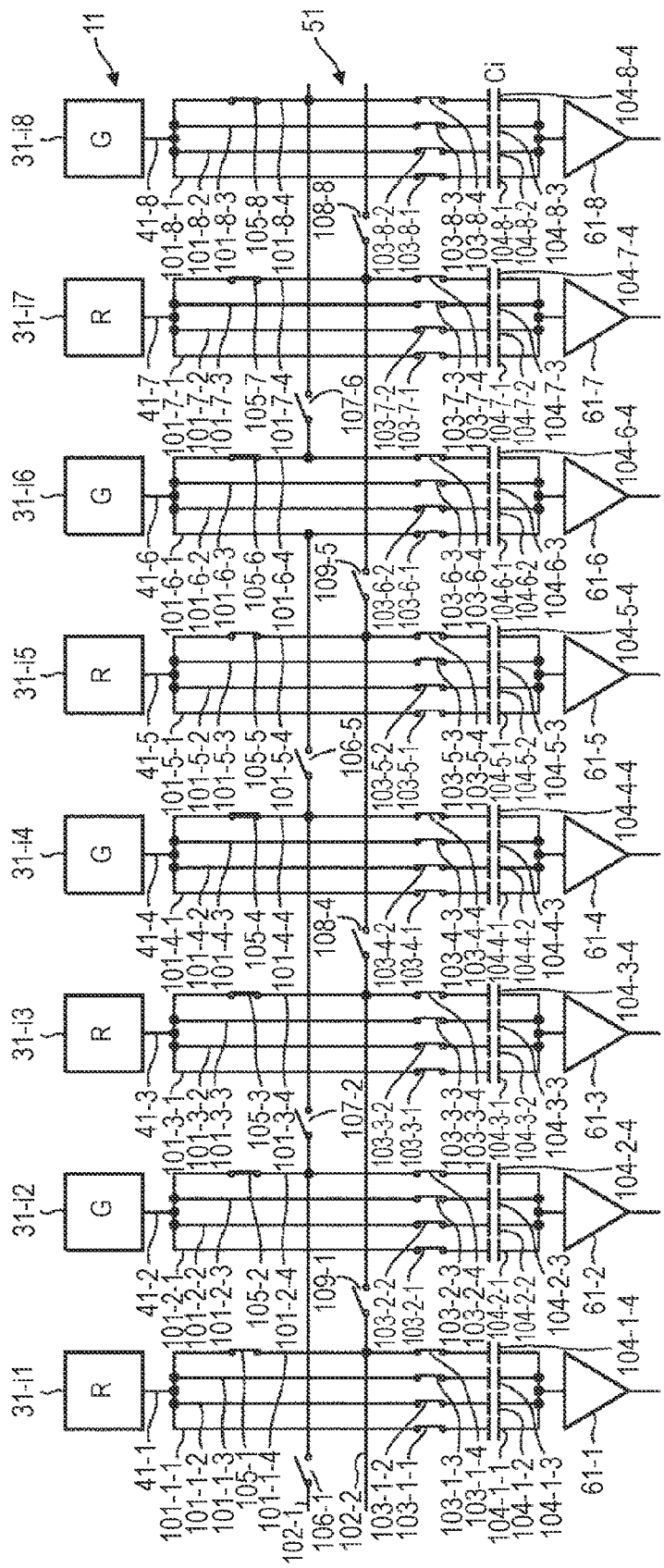
FIG. 2 is a view showing a configuration of a weighted addition unit at the time of reading out all pixels.

FIG. 2 is a view showing a configuration of the weighted addition unit 51 at the time of reading out all pixels. The weighted addition unit 51 shows a configuration in which weighted addition is performed between adjacent pixels of the same color in a ratio of 3:1. In FIG. 2, only eight columns which are j=1 to 8 are shown as a representative. Pixels 31-$ij$ to 31-$i$8 output pixel signals of red (R), green (G), red (R), green (G), red (R), green (G), red (R) and green (G), respectively.

In the weighted addition unit 51, the readout line 41-$j$ of the pixel 31-$ij$ is connected to plural (4(=3+1) in the embodiment) weighted lines 101-$j$-1 to 101-$j$-4. Switches 103-$j$-1 to 103-$j$-4 and capacitors 104-$j$-1 to 104-$j$-4 are connected in series to the four weighted lines 101-$j$-1 to 101-$j$-4. Additionally, a switch 105-$j$ is connected to one weighted line 101-$j$-4 of the four weighted lines, between the readout line 41-$j$ and the switch 103-$j$-4.

Terminals of the capacitor 104-$j$-1 to 104-$j$-4 on the side not connected to the switches 103-$j$-1 to 103-$j$-4 are mutually connected and connected to an input terminal of the corresponding comparator 61-$j$.

Lines of the row directions 102-1 and 102-2 are alternately connected to one weighted line 101-$j$-4 of the four weighted lines in respective column j. That is, the line 102-1 is connected to each one of weighted lines 101-2-4, 101-4-4, 101-6-4 and 101-8-4 of even-numbered columns 41-2, 41-4, 41-6 and 41-8 in the columns "j". The line 102-2 is connected to each one of weighted lines 101-1-4, 101-3-4, 101-5-4 and 101-7-4 of odd-numbered columns 41-1, 41-3, 41-5 and 41-7.

Switches 106-1, 107-2, 106-5, and 107-6 are sequentially connected to the line 102-1. The switches 106-1 and 106-5 are arranged every four columns. The switches 107-2 and 107-6 are also arranged every four columns.

A terminal of the switch 107-2 of the even-numbered column j=2 on the side of a smaller numbered column is connected to one weighted line 101-2-4 of the four weighted lines between the switch 105-2 and the switch 103-2-4. A terminal of the switch 107-6 of the even-numbered column j=6 which is four columns adjacent to the column j=2 on the side of a smaller numbered column is connected to one weighted line 101-6-4 of the four weighted lines between the switch 105-6 and the switch 103-6-4.

Actually, the switch 106-1 corresponds to the smallest numbered column j=1 and there is no column having smaller number than the column j=1, however, a terminal of the switch 106-1 on the side of a smaller numbered column which is virtually considered is opened. A terminal of the switch 106-5 corresponding to the column j=5 which is four columns adjacent to the column j=1 on the side of a smaller numbered column is connected to one weighted line 101-4-4 of the four weighted lines of the column j=4 between the switch 105-4 and the switch 103-4-4.

Switches 109-1, 108-4, 109-5, and 108-8 are sequentially connected to the line 102-2. The switches 109-1 and 109-5 are arranged every four columns. The switches 108-4 and 108-8 are also arranged every four columns.

A terminal of the switch 109-1 of the odd-numbered column j=1 on the side of a smaller numbered column is connected to one weighted line 101-1-4 of the four weighted lines of the column j=1 between the switch 105-1 and the switch 103-1-4. A terminal of the switch 109-5 of the odd-numbered column j=5 which is four columns adjacent to the column j=1 on the side of a smaller numbered column is connected to one weighted line 101-5-4 of the four weighted lines of the column j=5 between the switch 105-5 and the switch 103-5-4.

A terminal of the switch 108-4 corresponding to the column j=4 on the side of a smaller numbered column is connected to one weighted line 101-3-4 of the four weighted lines of the column j=3 between the switch 105-3 and the switch 103-3-4. A terminal of the switch 108-8 corresponding to the column j=8 which is four columns adjacent to the column j=4 on the side of a smaller numbered column is connected to one weighted line 101-7-4 of the four weighted lines of the column j=7 between the switch 105-7 and the switch 103-7-4.

The switches 106-1, 106-5, 108-4 and 108-8 are constantly off as they are provided for breaking processing by setting four columns as a unit.

The switches 105-2, 105-3, 105-6, 105-7 outputting pixel signals for weighted addition of a ratio of 1 in the ratio of 3:1 are constantly on. Additionally, the switches 103-1-1 to 103-1-4 of the four weighted lines 101-1-1 to 101-1-4 of the column j=1 outputting pixel signals to the comparator 61-1 are constantly on both at the time of outputting all pixel signals and at the time of outputting weighed addition of 3:1. Similarly, the switches 103-4-1 to the switches 103-4-4 of the weighted lines 101-4-1 to 101-4-4 of the column j=4 are constantly on. Furthermore, the switches 103-5-1 to 103-5-4 of the four weighted lines 101-5-1 to 101-5-4 of the column j=5 and the switches 103-8-1 to 103-8-4 of the four weighted lines 101-8-1 to 101-8-4 of the column j=8 are constantly on.

The switches which are constantly off/on can be omitted. However, when these switches are formed, patterns of respective columns will be uniform and stray capacitance will be fixed, therefore, variations due to noise can be suppressed. It is also possible to manufacture the device easily.

[Readout of All Pixel Signals]

Next, operations performed when reading out all pixel signals will be explained.

When all pixel signals are read out, all of the switches 105-1 to 105-8 arranged only in one line of the four lines in respective columns are entirely turned on as shown in FIG. 2. Additionally, the switches 103-1-1 to 103-1-4 of the column j=1 to the switches 103-8-1 to 103-8-4 of the column j=8 which are arranged in respective four lines are entirely turned on. However, the switches 106-1, 107-2, 106-5, 107-6, 109-1, 108-4, 109-5 and 108-8 which are connected to the lines 102-1 and 102-2 in the row direction are entirely turned off. Accordingly, respective columns are independent.

For example, pixel signals read out from pixels 31-11 to 31-18 of a row i=1 are simultaneously inputted to the weighted addition unit 51 through the readout current source unit 13.

For example, in the column j=1 the pixel signals are separately flows through the weighted lines 101-1-1 to 101-1-4, the switch 105-1, the switches 103-1-1 to 101-1-4, the capacitors 104-1-1 to 104-1-4, then, added again to be inputted to the comparator 61-1.

Though not shown in FIG. 2, the reference voltage outputted by the reference voltage generation unit 16 is inputted to the comparator 61-1 as the reference voltage at a given timing. The value of the reference voltage gradually increases in steps. The comparator 61-1 changes the output when the value of the reference voltage becomes higher than the value of the pixel signal. The counter 62-1 counts clocks outputted by the control unit 18 after the reference voltage is supplied and the latch unit 63-1 lathes a count value of the counter 62-1 at the timing when the output of the comparator 61-1 changes. The count value corresponds to the value of the pixel signal.

The count value latched by the latch unit 63-1 is inputted to the digital computing unit 17 through the bus 19 and is processed there.

The same operations are executed also in other columns, therefore, pixel signals of one row are read out by the above operations.

In the same manner, subsequent rows are sequentially selected and pixel signals of respective rows are read out.

The readout will be performed twice. That is, the readout is performed when the pixels are reset and when pixel signals corresponding to light amounts in a given exposure time are transferred to capacitors (not shown) in the pixels after that. The difference between the both readout is computed in the digital computing unit 17 to be definitive image data.

[Readout of Weighted Addition Pixel Signals]

Next, operations performed when reading out weighted addition pixel signals are read out will be explained.

Figure 3:
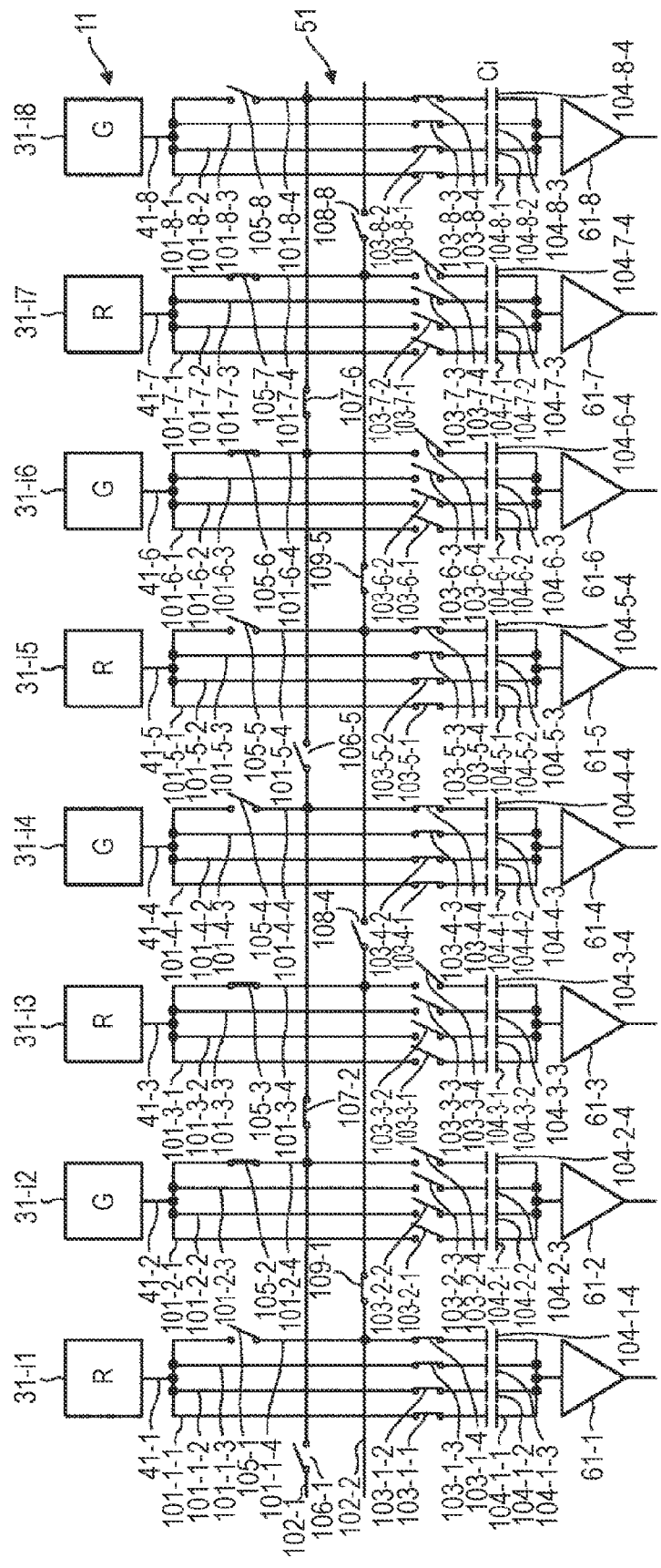
FIG. 3 is a view showing a configuration of the weighted addition unit at the time of performing weighed addition.

FIG. 3 is a view showing a configuration of the weighted addition unit 51 at the time of performing weighed addition. In the case of the embodiment, the weighted addition of 3:1 is performed.

In this case, as shown in FIG. 3, the switches 105-1, 105-4, 105-5 and 105-8 arranged only in one line of the four lines in respective columns are turned off. Additionally, the switches 103-2-1 to 103-2-4, switches 103-3-1 to 103-3-4, switches 103-6-1 to 103-6-4 and 103-7-1 to 103-7-4 in the switches arranged in respective four lines are turned off. Furthermore, the switches 107-2, 107-6, 109-1 and 109-5 in the switches connected to the lines in the row directions 102-1 and 102-2 are turned on.

Operations other than an operation by the weighted addition unit 51 are the same as in the case of reading out all pixel signals, therefore, only the operation of the weighted addition unit 51 will be explained below.

As the switches 106-1 and 106-5 provided every four columns on the line 102-1 and the switch 108-4 and 108-8 provided every four columns on the line 102-2 are off, weighted addition processing will be performed in units of four columns. The switches 106-1 and 106-5 on the line 102-1 control the units of even-numbered columns in the weighted addition processing and the switches 108-4 and 108-8 on the line 102-2 control the units of odd-numbered columns in the weighted addition processing.

When focusing attention on the odd-numbered column j=3 of the pixel of red (R) 31-*i*3, switches 103-3-1 to 103-3-4 on four weighted lines 101-3-1 to 101-3-4 are entirely off, therefore, a comparator 61-3 does not output a signal.

When focusing attention on the odd-numbered column j=1 of the pixel of red (R) 31-*i*1, the switches 103-1-1 on one weighted line 101-1-1 of the four weighted lines is on, pixel signals from the readout line 41-1 charge the capacitor 104-1-1 through the weighted line 101-1-1 and the switch 103-1-1. Similarly, the switches 103-1-2 and 103-1-3 on the weighted lines 101-1-2 and 101-1-3 are on. As a result, the pixel signals of the pixel 31-*i*1 from the readout line 41-1 charge the capacitors 104-1-2 and 104-1-3 through the switches 103-1-2 and 103-1-3.

On the other hand, the pixel signals from the readout line 41-1 are not supplied to the weighted line 101-1-4 as the switch 105-1 is off. Instead, the switch 109-1 is on, therefore, pixel signals of the pixel 31-*i*3 inputted from the readout line 41-3 to the weighted line 101-3-4 as one of the four weighted lines of the column j=3 is supplied to the capacitor 104-1-1 through the switches 109-1 and 103-1-4.

When focusing on the odd-numbered column j=3, the switches 103-3-1 to 103-3-4 on the four weighted lines 101-3-1 to 101-3-4 are entirely off, therefore, the comparator 61-3 does not output a signal.

The same operation is performed also in other odd-numbered columns j=5, 7.

Next, when focusing attention on the even-numbered column j=4, the switches 103-4-1 on one weighted line 101-4-1 of the four weighted lines is on, therefore, pixel signals of the pixel 31-*i*4 from the readout line 41-4 charge a capacitor 104-4-1 through the weighted line 101-4-1 and the switch 103-4-1. Similarly, switches 103-4-2 and 103-4-3 on weighted lines 101-4-2 and 101-4-3 are on. As a result, the pixel signals of the pixel 31-*i*4 from the readout line 41-4 charge capacitors 104-4-2 and 104-4-3 through the weighted lines 101-4-2 and 101-4-3 and the switches 103-4-2 and 103-4-3.

On the other hand, the pixel signals of the pixel 31-*i*4 from the readout line 41-4 are not supplied to the weighted line 101-4-4 as the switch 105-4 is off. Instead, the switch 107-2 is on, therefore, the pixel signals of a pixel 31-*i*2 inputted from the readout line 41-2 to a weighted line 101-2-4 as one of the four weighted lines of the column j=2 are supplied to a capacitor 104-4-4 through the switches 107-2 and 103-4-4.

The same operation is performed also in other even-numbered columns j=6, 8.

[Principle of Weighted Addition]

Figure 4:
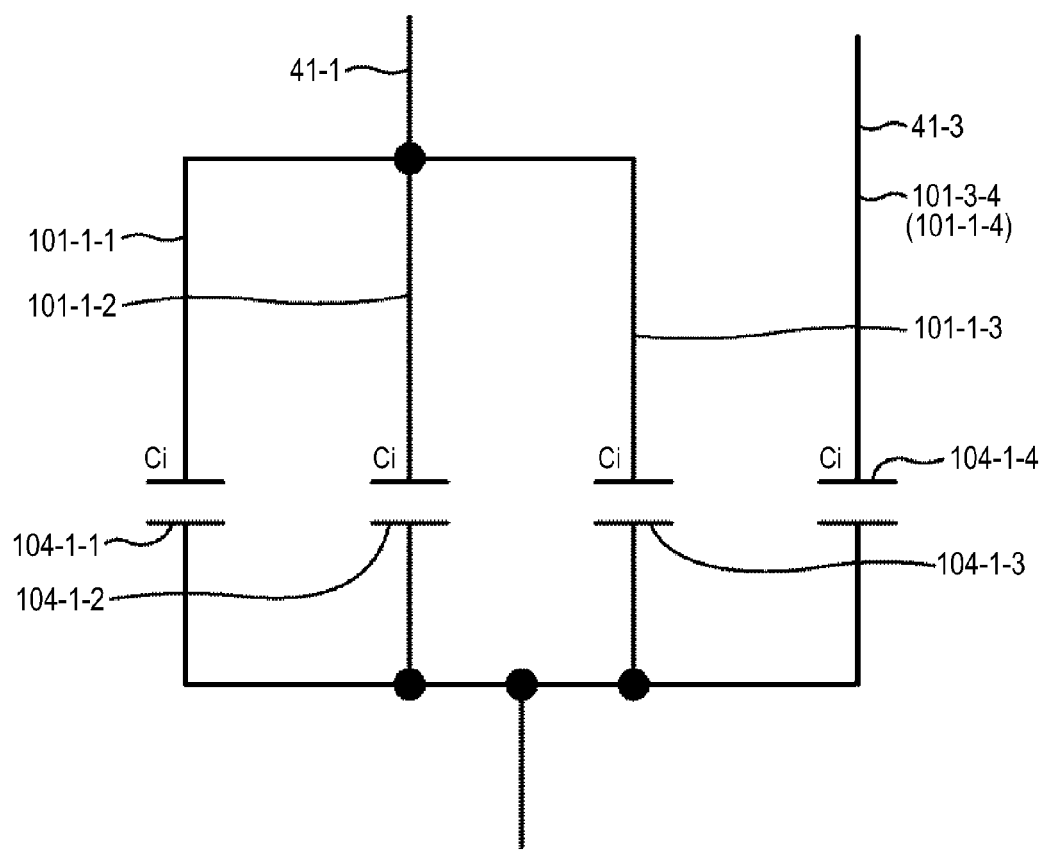
FIG. 4 is a diagram for explaining weighted addition.

The above operations in the odd-numbered columns can be summarized as shown in FIG. 4. FIG. 4 is a diagram for explaining weighted addition.

Here, assume that a pixel signal level (namely, a voltage at upper terminals of the capacitors 104-1-1 to 104-1-3 in FIG. 4) at the time of resetting red (R) in the column j=1 is Vrst3. Also, assume that a pixel signal level (namely, a voltage at an upper terminal of the capacitor 104-1-4 in FIG. 4) at the time of resetting red (R) in the column j=3 is Vrst1. Furthermore, assume that a weighted pixel signal level (namely, a voltage at lower terminals of the capacitors 104-1-1 to 104-1-4 in FIG. 4) at the time of resetting in the column j=1 is VSLrst.

Additionally, assume that the pixel signal level (namely, a voltage at upper terminals of the capacitors 104-1-1 to 104-1-3 in FIG. 4) at the time of transferring pixel signals in the column j=1 is Vsig3. Also, assume that the pixel signal level (namely, a voltage at an upper terminal of the capacitor 104-1-4 in FIG. 4) at the time of transferring the pixel signal in the column j=3 is Vsig1. Furthermore, assume that the weighted pixel signal level (namely, a voltage at lower terminals of the capacitors 104-1-1 to 104-1-4 in FIG. 4) at the time of transferring pixel signals in the column j=1 is VSLout.

The following expression (1) holds according to charge conservation. "Ci" represents capacitance of the capacitors 104-1-1 to 104-1-4.

$$3Ci(VSLrst-Vrst3)+Ci(VSLrst-Vrst1)=3Ci(VCLout-Vsig3)+Ci(VSLout-Vsig1) \quad (1)$$

The following expression (2) can be obtained when the expression (1) is corrected.

$$VSLout-VSLrst=(3/4)(Vsig3-Vrst3)+(1/4)(Vsig1-Vrst1) \quad (2)$$

As apparent from the expression (2), the pixel signal of red which is the difference between the transferring point and the resetting point represented by a left side of the expression (2) is obtained by performing weighted addition between the pixel signals of red of the column j=1 and the pixel signals of red of the column j=3 in the ratio of 3:1.

The same relation holds also in other odd-numbered columns j=5, 7.

The operation concerning the pixels 31 of red (R) in the odd-numbered columns is performed in the same manner also concerning pixels of green (G) 31 in the even-numbered columns. The above expressions (1) and (2) hold according to charge conservation also in the even-numbered columns. However, in the expression (2), pixel signals of the column j=4 are weighted with the ratio of 3/4 and pixel signals of the column j=2 are weighted with the ratio of 1/4. The weighted addition is performed on pixels of red (R) in the ratio of 3:1 based on the direction in which the column number is increased, and the weighted addition is performed on pixels of green (G) in a ratio of 1:3, in which arrangement of numerals representing the ratio of weight is reversed.

The capacitors 104-1-1 to 104-1-3 in FIG. 4 can be formed as one capacitor. However, the patterns of respective columns will be uniform and stray capacitance will be fixed by individually arranging the capacitors in the same manner as the above-described switches, which can suppress variation due to noise. It is also possible to manufacture the device easily.

[Results of Weighted Addition]

Figure 5:
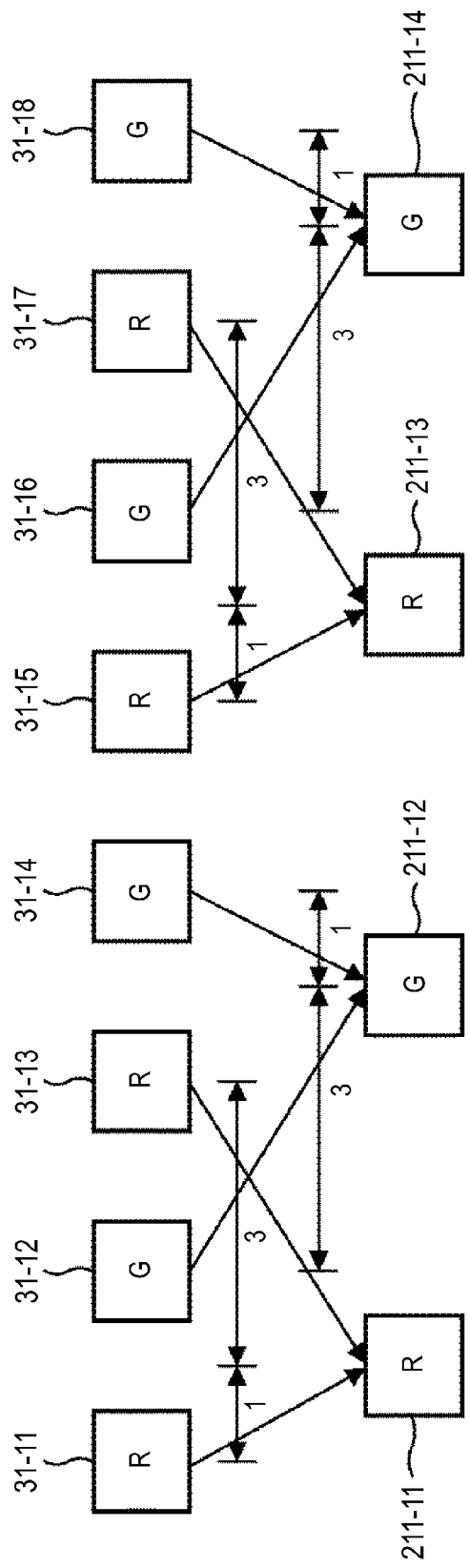
FIG. 5 is a view for explaining results of weighted addition of odd-numbered rows.

Next, results of the weighted addition will be explained with reference to FIG. 5 and FIG. 6. FIG. 5 is a view for explaining results of weighted addition in odd-numbered rows. When the weighted addition is performed between the pixel signal of the pixel of red (R) 31-11 and the pixel signal of red (R) 31-13 in the ratio of 3:1, the pixel signal will be a pixel signal in a position where the distance between the pixel 31-11 and the pixel 31-13 is internally divided in the ratio of 1:3. That is, when the distance between the pixel 31-11 and the pixel 31-13 is "L", the pixel signal of a pixel 211-11 in a position of L/4 in the direction from the pixel 31-11 to the pixel 31-13, namely, in a position of 3L/4 in the direction from the pixel 31-13 to the pixel 31-11 is calculated.

In the same manner, when the weighted addition is performed between the pixel signal of the pixel of green (G) 31-12 and the pixel signal of green (G) 31-14 in the ratio of 1:3, the pixel signal will be a pixel signal in a position where the distance between the pixel 31-12 and the pixel 31-14 is internally divided in the ratio of 3:1. That is, when the distance between the pixel 31-12 and the pixel 31-14 is "L", the pixel signal of a pixel 211-12 in a position of 3L/4 in the direction from the pixel 31-12 to the pixel 31-14, namely, in a position of L/4 in the direction from the pixel 31-14 to the pixel 31-12 is calculated.

The same applies to pixels 31-15 to pixels 31-18, and pixels 211-13 and 211-14 are generated based on these pixels.

As apparent from FIG. 5, the arrangement of numerals representing the ratio of weight of the pixels of red (R) 31 and the arrangement of numerals representing the ratio of weight of pixels of green (G) 31 are reversed (namely, 3:1 and 1:3), therefore, the generated pixels 211-11 and 211-14 are uniformly arranged.

Figure 6:
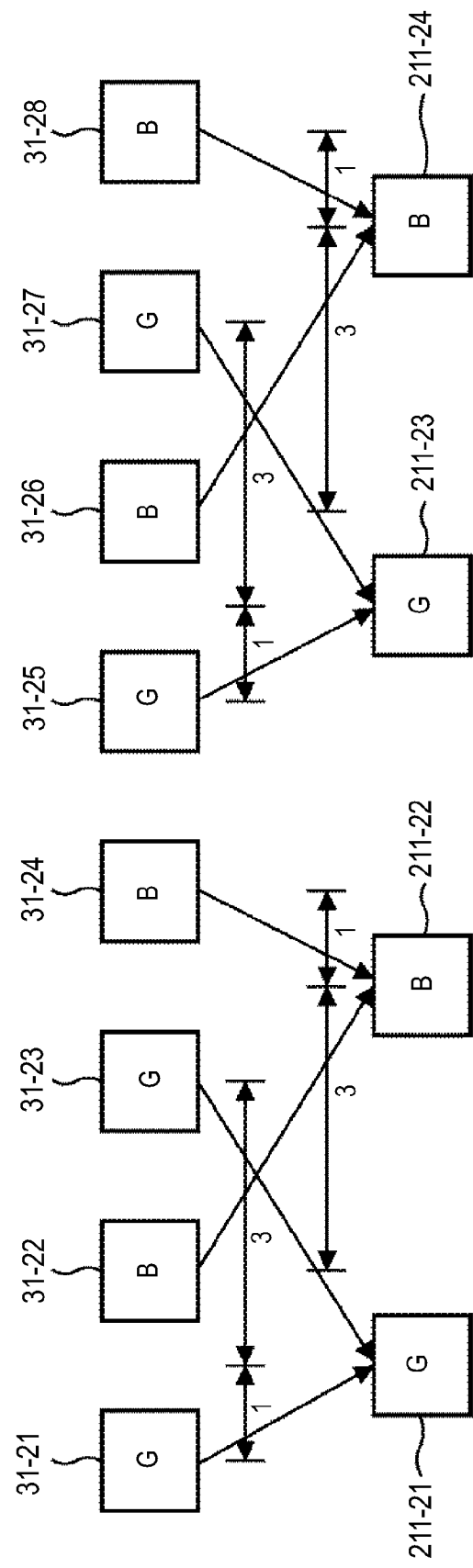
FIG. 6 is a view for explaining results of weighted addition of even-numbered rows.

FIG. 6 is a view for explaining results of weighted addition in even-numbered rows. When the weighted addition is performed between the pixel signal of the pixel of green (G) 31-21 and the pixel signal of the pixel of green (G) 31-23 in the ratio of 3:1, the pixel signal will be a pixel signal in a position where the distance between the pixel 31-21 and the pixel 31-23 is internally divided in the ratio of 1:3. That is, when the distance between the pixel 31-21 and the pixel 31-23 is "L", the pixel signal of a pixel 211-21 in a position of L/4 in the direction from the pixel 31-21 to the pixel 31-23, namely, in a position of 3L/4 in the direction from the pixel 31-23 to the pixel 31-21 is calculated.

In the same manner, when the weighted addition is performed between the pixel signal of the pixel of blue (B) 31-22 and the pixel signal of blue (B) 31-24 in the ratio of 1:3, the pixel signal will be a pixel signal in a position where the distance between the pixel 31-22 and the pixel 31-24 is internally divided in the ratio of 3:1. That is, when the distance between the pixel 31-22 and the pixel 31-24 is "L", the pixel signal of a pixel 211-22 in a position of 3L/4 in the direction from the pixel 31-22 to the pixel 31-24, namely, in a position of L/4 in the direction from the pixel 31-24 to the pixel 31-22 is calculated.

The same applies to pixels 31-25 to pixels 31-28, and pixels 211-23 and 211-24 are generated based on these pixels.

As apparent from FIG. 6, the arrangement of numerals representing the ratio of weight of the pixels of green (G) 31 and the arrangement of numerals representing the ratio of weight of pixels of blue (B) 31 are reversed (namely, 3:1 and 1:3), therefore, the generated pixels 211-21 and 211-24 are uniformly arranged.

As described above, it is possible to generate an image contracted to ½ by performing weighted addition. Additionally, the arrangements of numerals representing the ratio of weight with respect to pixels of different colors on the same line are reversed to each other, therefore, the newly-generated pixels 211-11 to 211-14 as well as 211-21 to 211-24 are uniformly arranged. As a result, deterioration of image quality can be suppressed. Furthermore, weighted addition is performed as analog signals, therefore, it is not necessary to read out all pixel signals at the time of performing weighted addition, which suppresses power consumption.

Figure 7B:
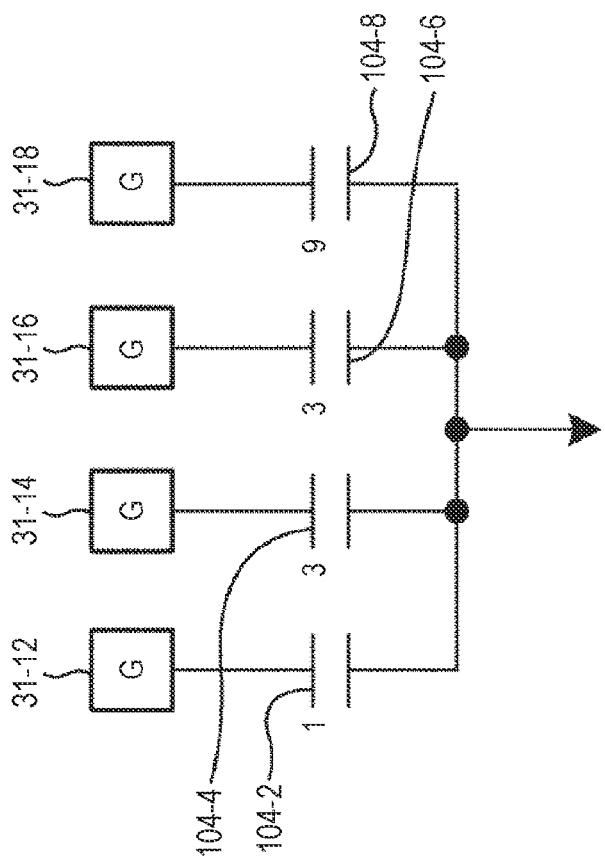
FIGS. 7A and 7B are views for explaining weighted addition of another example.
Figure 7A:
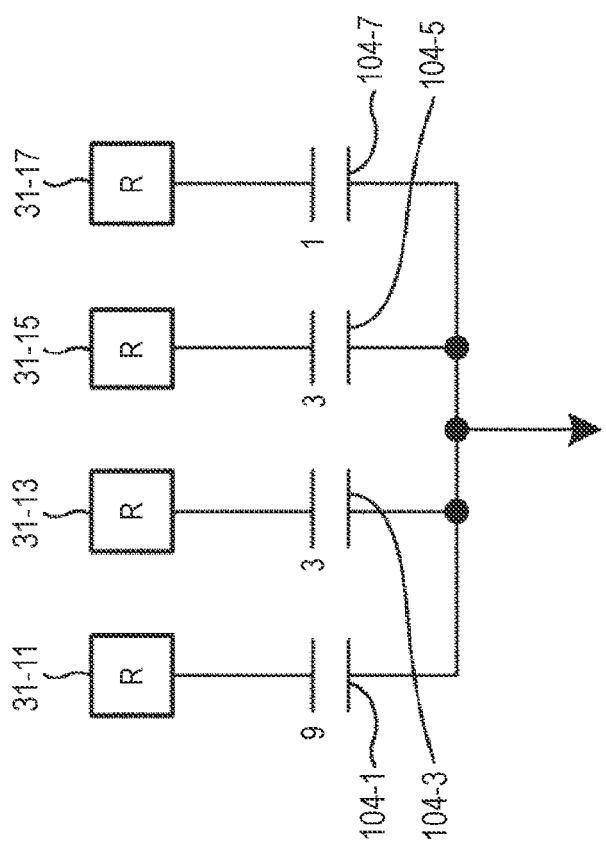

FIGS. 7A and 7B are views for explaining weighted addition of another example. In the embodiment, weighted addition is performed on pixel data of pixels of red (R) 31-11, 31-13, 31-15 and 31-17 through the capacitors 104-1, 104-3, 104-5 and 104-7 in the ratio of 9:3:3:1 as shown in FIG. 7A. Similarly, weighted addition is performed on pixel data of pixels of green (G) 31-12, 31-14, 31-16 and 31-18 through the capacitors 104-2, 104-4, 104-6 and 104-8 in the ratio of 1:3:3:9 in which arrangement of numerals representing the ratio of weight is reversed with respect to the pixels of red (R) as shown in FIG. 7B.

Figure 8:
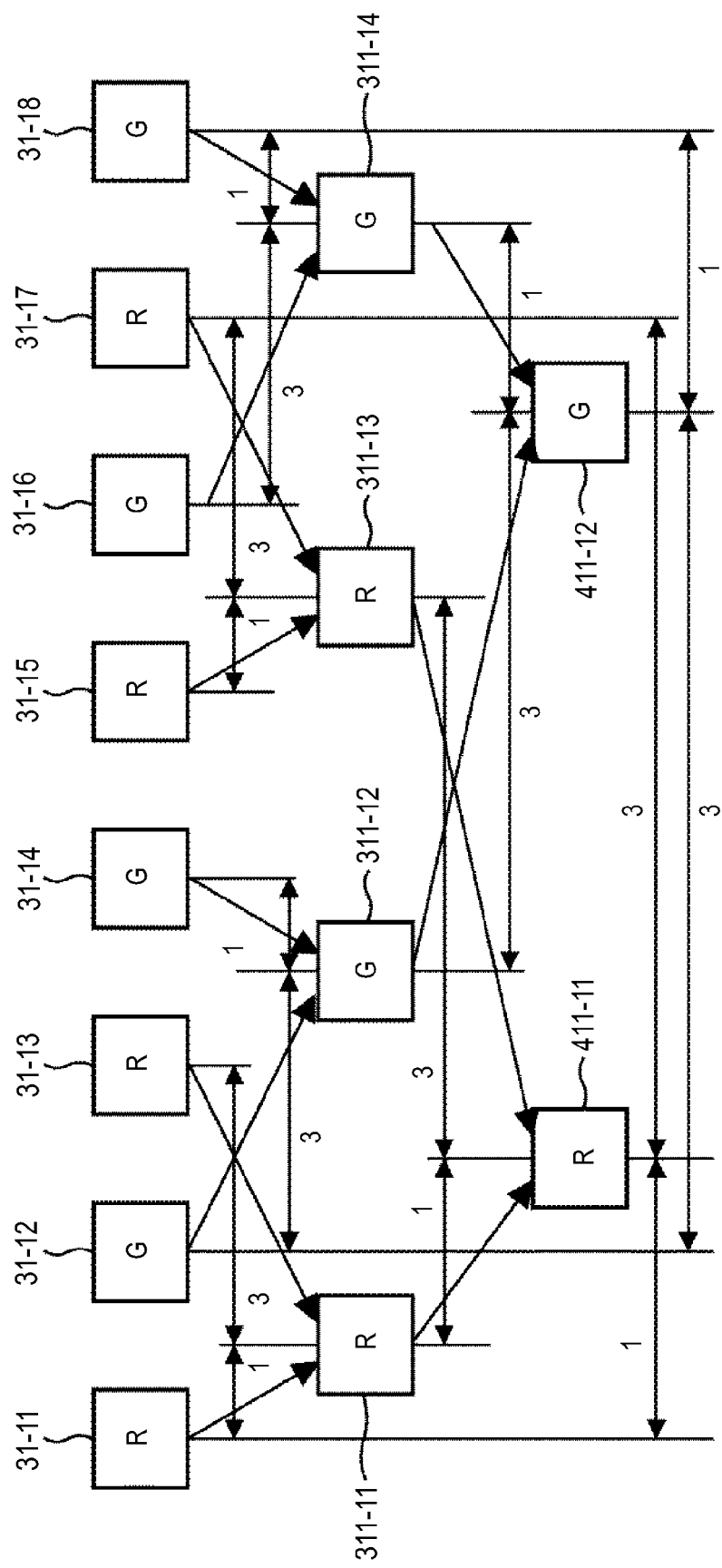
FIG. 8 is a view for explaining results of performing weighted addition.
Figure 9:
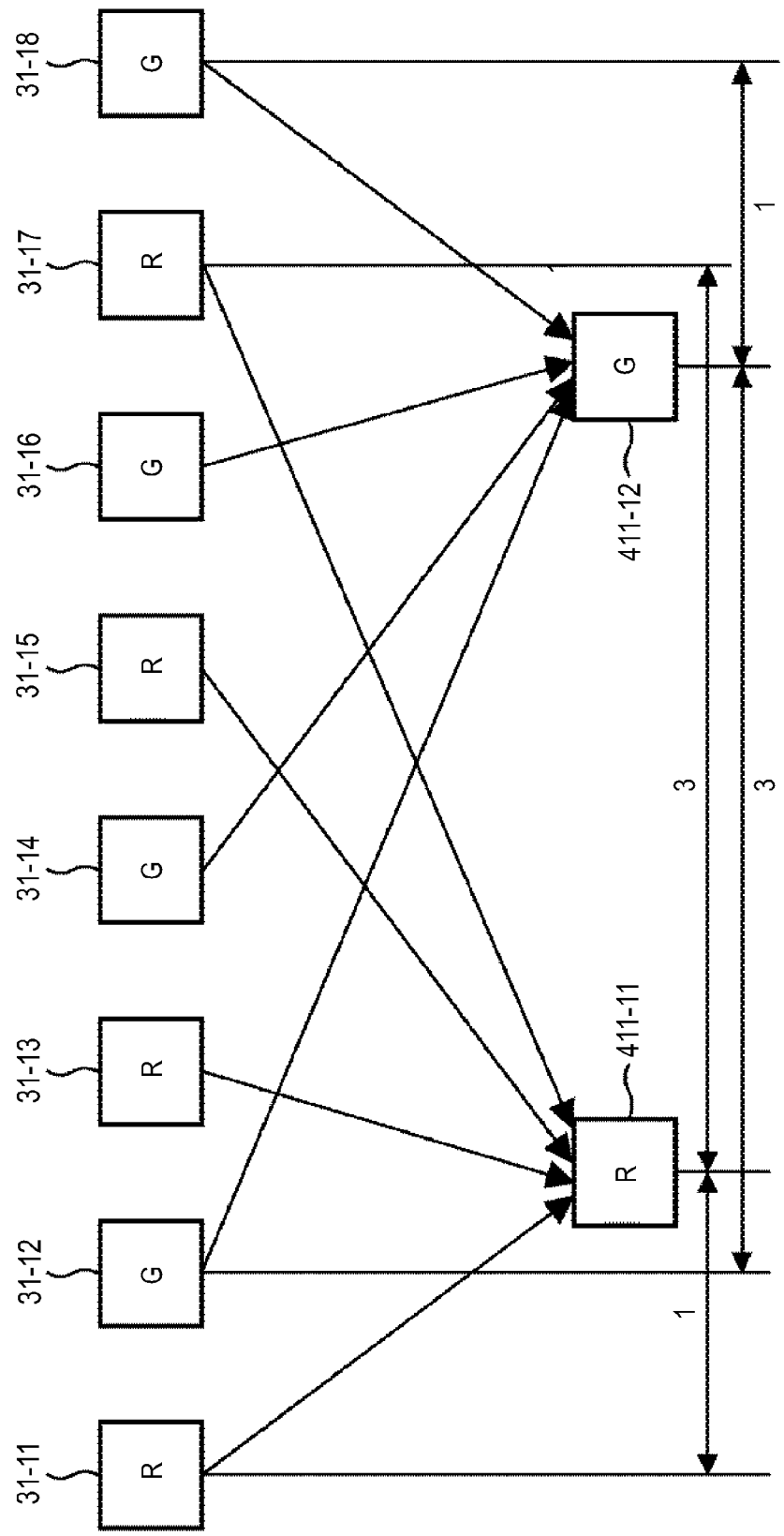
FIG. 9 is a view for explaining results of performing weighted addition.

FIG. 8 and FIG. 9 are views for explaining results of performing weighted addition. As shown in FIG. 8, when weighted addition is performed between the pixel of red (R) 31-11 and the pixel of red (R) 31-13 in the ratio of 3:1, a pixel 311-11 is virtually formed at a position of a distance L/4 from the pixel 31-11 (position of a distance 3L/4 from the pixel 31-13). Similarly, when weighted addition is performed on the pixel of red (R) 31-15 and the pixel of red (R) 31-17 in the ratio of 3:1, a pixel 311-13 is virtually formed at a position of the distance L/4 from the pixel 31-15 (position of the distance 3L/4 from the pixel 31-17).

Additionally, when weighted addition is performed on the pixel of green (G) 31-12 and the pixel of green (G) 31-14 in the ratio of 1:3, a pixel 311-12 is virtually formed at a position of the distance 3L/4 from the pixel 31-12 (position of the distance L/4 from the pixel 31-14). Similarly, when weighted addition is performed on the pixel of green (G) 31-16 and the pixel of green (G) 31-18 in the ratio of 1:3, a pixel 311-14 is virtually formed at a position of the distance 3L/4 from the pixel 31-16 (position of the distance L/4 from the pixel 31-18).

When weighted addition is further performed on the pixel of red (R) 311-11 and the pixel of red (R) 311-13 virtually formed as described above in the ratio of 3:1, a pixel 411-11 is virtually formed at a position of the distance L/4 from the pixel 311-11 (position of the distance 3L/4 from the pixel 311-13). Furthermore, when weighted addition is performed on the vertically formed pixel of green (G) 311-12 and the pixel of green (G) 311-14 in the ratio of 1:3, a pixel 411-12 is virtually formed at a position of the distance 3L/4 from the pixel 311-12 (position of the distance L/4 from the pixel 311-14).

The pixel of red (R) 311-11 is the pixel obtained by performing weighted addition on the pixel of red (R) 31-11 and the pixel of red (R) 31-13 in the ratio of 3:1, the pixel of red (R) 311-13 is the pixel obtained by performing weighted addition on the pixel of red (R) 31-15 and the pixel of red (R) 31-17 in the ratio of 1:3. The pixel of red (R) 411-11 is obtained by performing weighted addition on the pixel of red (R) 311-11 and the pixel of red (R) 311-13 in the ratio of 3:1.

Therefore, the pixel of red (R) 411-11 is obtained by performing weighted addition on the pixels 31-11, 31-13, 31-15 and 31-17 in the ratio of 9:3:3:1.

The pixel of green (G) 311-12 is the pixel obtained by performing weighted addition on the pixel of green (G) 31-12 and the pixel of green (G) 31-14 in the ratio of 1:3, the pixel of green (G) 311-14 is the pixel obtained by performing weighted addition on the pixel of green (G) 31-16 and the pixel of green (G) 31-18 in the ratio of 1:3. The pixel of green (G) 411-12 is obtained by performing weighted addition on the pixel of green (G) 311-12 and the pixel of green (G) 311-14 in the ratio of 1:3. Therefore, the pixel of green (G) 411-12 is obtained by performing weighted addition on the pixels 31-12, 31-14, 31-16 and 31-18 in the ratio of 1:3:3:9.

In FIG. 8, explanation has been made so that the weighted addition is performed in two stages, however, it is actually possible to generate the pixel of red (R) 411-11 by performing weighted addition on the pixels of red (R) 31-11, 31-13, 31-15 and 31-17 just once in the ratio of 9:3:3:1. Similarly, it is possible to generate the pixel of green (G) 411-12 by performing weighted addition on the pixels of green (G) 31-12, 31-14, 31-16 and 31-18 just once in the ratio of 1:3:3:9.

In this case, the weighed lines of each column will be 16(=9+3+3+1). When reading out all pixel signals, the weighted lines of each column are independent, and switches are arranged and switched so that pixel signals of 16 weighted lines are added in each column and outputted.

When the weighted addition is performed, the pixel signal of the pixel 31-13 is supplied to three of the 16 weighted lines of the pixel 31-11 instead of the pixel signal outputted from the pixel 31-11 in the column of red (R). The switches are arranged and switched so that the pixel signal of the pixel 31-15 is supplied to another three weighted lines and further, the pixel signal of the pixel 31-17 is supplied to one weighted line.

Similarly, the pixel signal of the pixel 31-16 is supplied to three of the 16 weighted lines of the pixel 31-18 instead of the pixel signal outputted from the pixel 31-18 in the column of green (G). The switches are arranged and switched so that the pixel signal of the pixel 31-14 is supplied to another three weighted lines and the pixel signal of the pixel 31-12 is supplied to another one weighted line.

Also in the above case, the pixels 411-11 and 411-12 are uniformly arranged.

The solid-state imaging device 1 may be formed by, for example, a CCD image sensor. Colors and arrangement of the pixels are not limited to the above examples.

[Configuration of Imaging Apparatus]

Figure 10:
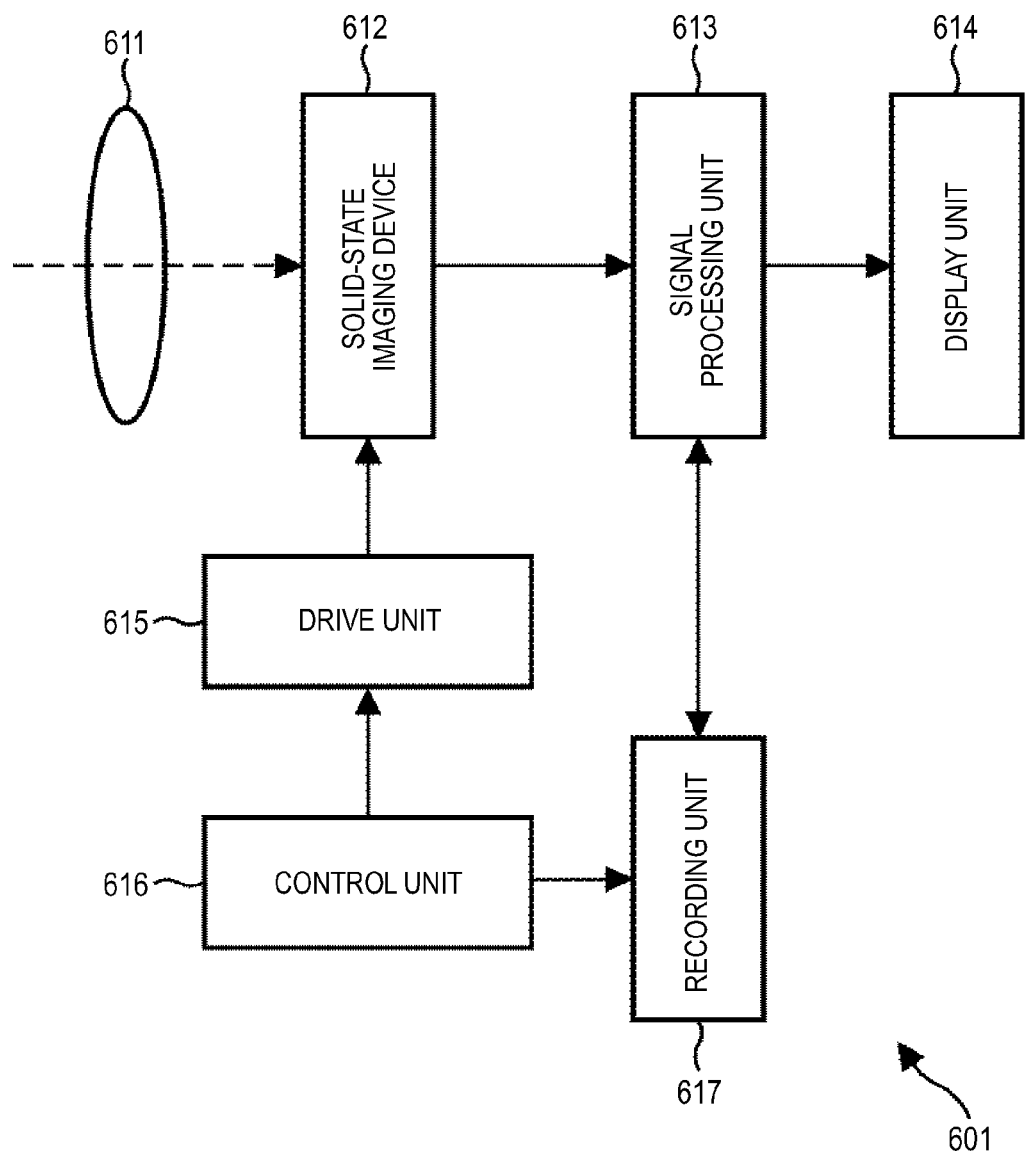
FIG. 10 is a block diagram showing a configuration of an imaging apparatus.

The solid-state imaging device 1 having the above configuration can be applied to imaging apparatuses such as a digital camera and a video camera. FIG. 10 is a block diagram showing a configuration of an imaging apparatus.

An imaging apparatus 601 includes a lens 611, a solid-state imaging device 612, a signal processing unit 613, a display unit 614, a drive unit 615, a control unit 616 and a recording unit 617.

The lens 611 allows light from an object to be incident on the solid-state imaging device 612. The solid-state imaging device 612 has the same configuration as the above solid-state imaging device 1, which is driven by the drive unit 615 and outputs image data corresponding to light from the object to the signal processing unit 613. The signal processing unit 613 generates image signals based on pixel signals from the solid-state imaging device 612 and outputs the image signals to the display unit 614 to be displayed thereon. The image data is recorded in the recording unit 617 if necessary. The control unit 616 controls the drive unit 615 and the recording unit 617 in accordance with an instruction from the user.

The solid-state imaging device 612 of the imaging apparatus 601 has the same configuration as the solid-state imaging device 1, therefore, it is possible to suppress power consumption when performing weighted addition.

The present disclosure is not limited to the above embodiment and can be variously modified within a scope not departing from the gist of the present disclosure.

The present disclosure can be implemented as the following configurations.

(1) A solid-state imaging device including
a pixel array unit having plural pixels arranged in a row direction and a column direction,
a weighted addition unit performing weighted addition on pixel signals read out from the plural pixels as analog signals,
an A/D converter performing A/D conversion of the pixel signals on which weighted addition is performed, and
a computing unit computing the A/D converted pixel signals.

(2) The solid-state imaging device described in the above (1),
in which pixels of a first color and a second color are arranged in rows, and
arrangement of numerals representing a ratio of weight of the first color is reversed with respect to arrangement of numerals representing a ratio of weight of the second color.

(3) The solid-state imaging device described in the above (1) or (2),
in which the weighted addition unit includes, in the first color and the second color respectively,
plural weighted lines connected to one readout line which reads out the pixel signals from the pixels of one column and to which the pixel signals from one readout line are inputted,
capacitors connected in series to the respective weighted lines,
a first switch arranged on one weighed line of the plural weighted lines of one column and controlling supply of the pixel signals from the readout line to the capacitor in the corresponding column, and
a second switch supplying the signals from one weighted line in another column of the same color to the capacitor in which the supply of the pixel signals is controlled by the first switch.

(4) The solid-state imaging device described in the above (1), (2) or (3), further includes
a third switch controlling supply of the pixel signals to the capacitor in the corresponding column in the weighed line of the column supplying the pixel signals to another column of the same color through the second switch when supplying the pixel signals to another column of the same color through the second switch.

(5) The solid-state imaging device described in any one of the above (1) to (4),
in which the ratio of weight in the first color is 3:1 and the ratio of weight in the second color is 1:3.

(6) The solid-state imaging device described in any one of the above (1) to (4),
in which the ratio of weight in the first color is 9:3:3:1 and the ratio of weight in the second color is 1:3:3:9.

(7) An imaging method including
performing weighted addition on pixel signals read out from plural pixels arranged in a row direction and in a column direction in a pixel array unit as analog signals,
performing A/D conversion of the pixel signals on which the weighted addition is performed, and
computing the A/D converted pixel signals.

(8) An imaging apparatus including
a solid-state imaging device performing photoelectric conversion of light from a lens, and
a display unit displaying images based on image signals from the solid-state imaging device,
in which the solid-state imaging device has
a pixel array unit having plural pixels arranged in a row direction and a column direction,
a weighted addition unit performing weighted addition on pixel signals read out from the plural pixels as analog signals,
an A/D converter performing A/D conversion of the pixel signals on which weighted addition is performed, and
a computing unit computing the A/D converted pixel signals.

The present disclosure contains subject matter related to that disclosed in Japanese Priority Patent Application JP 2011-092986 filed in the Japan Patent Office on Apr. 19, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
a pixel array unit having plural pixels arranged in a row direction and a column direction;
a weighted addition unit performing weighted addition on pixel signals read out from the plural pixels as analog signals, the weighted addition unit including plural weighted lines connected to a first readout line which reads out pixel signals from the pixels of a first column, the weighted addition unit further including plural weighted lines connected to a second readout line which reads out the pixel signals from the pixels of a second column, wherein the weighted addition is based on (i) a quantity of conductive plural weighted lines connected to the first readout line; and (ii) a quantity of conductive plural weighted lines connected to the second readout line;
an A/D converter performing A/D conversion of the pixel signals on which weighted addition is performed; and
a computing unit computing the A/D converted pixel signals.

2. The solid-state imaging device according to claim 1,
wherein pixels of a first color and a second color are arranged in rows, and
arrangement of numerals representing a ratio of weight of the first color is reversed with respect to arrangement of numerals representing a ratio of weight of the second color.

3. The solid-state imaging device according to claim 2,
wherein the weighted addition unit further includes, in the first color and the second color respectively,
capacitors connected in series to each of the weighted lines,
a first switch arranged on one weighed line of the plural weighted lines of the first column and controlling supply of the pixel signals from the first readout line to the capacitor in the corresponding column, and
a second switch supplying the signals from one weighted line in the second column of the same color to the capacitor in which the supply of the pixel signals is controlled by the first switch.

4. The solid-state imaging device according to claim 3, further comprising:

a third switch controlling supply of the pixel signals to the capacitor in the corresponding column in the weighed line of the column supplying the pixel signals to the second column of the same color through the second switch when supplying the pixel signals to the second column of the same color through the second switch.

5. The solid-state imaging device according to claim 4, wherein a ratio of weight in the first color is 3:1 and a ratio of weight in the second color is 1:3, wherein the ratio of weight corresponds to a quantity of conductive weighted lines for each color.

6. The solid-state imaging device according to claim 4, wherein the weighted addition unit includes plural weighted lines connected to a third readout line which reads out pixel signals from the pixels of a third column, the weighted addition unit further including plural weighted lines connected to a fourth readout line which reads out the pixel signals from the pixels of a fourth column and
a ratio of weight in the first color is 9:3:3:1 and a ratio of weight in the second color is 1:3:3:9, wherein the ratio of weight corresponds to a quantity of conductive lines for each color.

7. An imaging method comprising:
performing weighted addition on pixel signals read out from plural pixels arranged in a row direction and in a column direction in a pixel array unit as analog signals, wherein the weighted addition is based on (i) a quantity of conductive plural weighted lines connected to a first readout line; and (ii) a quantity of conductive plural weighted lines connected to a second readout line;
performing A/D conversion of the pixel signals on which the weighted addition is performed; and
computing the A/D converted pixel signals.

8. An imaging apparatus comprising:
a solid-state imaging device performing photoelectric conversion of light from a lens; and
a display unit displaying images based on image signals from the solid-state imaging device,
wherein the solid-state imaging device includes:
a pixel array unit having plural pixels arranged in a row direction and a column direction,
a weighted addition unit performing weighted addition on pixel signals read out from the plural pixels as analog signals, the weighted addition unit including plural weighted lines connected to a first readout line which reads out pixel signals from the pixels of a first column, the weighted addition unit further including plural weighted lines connected to a second readout line which reads out the pixel signals from the pixels of a second column, wherein the weighted addition is based on (i) a quantity of conductive plural weighted lines connected to the first readout line; and (ii) a quantity of conductive plural weighted lines connected to the second readout line,
an A/D converter performing A/D conversion of the pixel signals on which weighted addition is performed, and
a computing unit computing the A/D converted pixel signals.

9. The solid-state imaging device according to claim 8, wherein pixels of a first color and a second color are arranged in rows, and
arrangement of numerals representing a ratio of weight of the first color is reversed with respect to arrangement of numerals representing a ratio of weight of the second color.

10. The solid-state imaging device according to claim 9, wherein the weighted addition unit further includes, in the first color and the second color respectively,
capacitors connected in series to each of the weighted lines,
a first switch arranged on one weighed line of the plural weighted lines of the first column and controlling supply of the pixel signals from the first readout line to the capacitor in the corresponding column, and
a second switch supplying the signals from one weighted line in the second column of the same color to the capacitor in which the supply of the pixel signals is controlled by the first switch.

11. The solid-state imaging device according to claim 10, further comprising:
a third switch controlling supply of the pixel signals to the capacitor in the corresponding column in the weighed line of the column supplying the pixel signals to the second column of the same color through the second switch when supplying the pixel signals to the second column of the same color through the second switch.

12. The solid-state imaging device according to claim 11, wherein a ratio of weight in the first color is 3:1 and a ratio of weight in the second color is 1:3, wherein the ratio of weight corresponds to a quantity of active weighted lines for each color.

13. The solid-state imaging device according to claim 11, wherein the weighted addition unit includes plural weighted lines connected to a third readout line which reads out pixel signals from the pixels of a third column, the weighted addition unit further including plural weighted lines connected to a fourth readout line which reads out the pixel signals from the pixels of a fourth column, and
a ratio of weight in the first color is 9:3:3:1 and a ratio of weight in the second color is 1:3:3:9, wherein the ratio of weight corresponds to a quantity of active weighted lines for each color.

* * * * *